US009003958B2

(12) United States Patent
Scrivani

(10) Patent No.: US 9,003,958 B2
(45) Date of Patent: Apr. 14, 2015

(54) SINGLE-USE FILTERING CAPSULE FOR THE CREATION OF AN ALIMENTARY INFUSION

(75) Inventor: Massimo Scrivani, Casteggio (IT)

(73) Assignee: Azionaria Construzioni Macchine Automatiche A.C.M.A. S.p.A. (IT)

( * ) Notice: Subject to any disclaimer, the term of this patent is extended or adjusted under 35 U.S.C. 154(b) by 862 days.

(21) Appl. No.: 12/879,518

(22) Filed: Sep. 10, 2010

(65) Prior Publication Data
US 2011/0283890 A1 Nov. 24, 2011

(30) Foreign Application Priority Data
May 24, 2010 (IT) .............................. MI2010A0931

(51) Int. Cl.
*A47J 31/06* (2006.01)
*A47G 19/14* (2006.01)
*B65D 85/804* (2006.01)

(52) U.S. Cl.
CPC .................................. *B65D 85/8043* (2013.01)

(58) Field of Classification Search
USPC ............. 99/295, 323, 279, 300, 302 R, 302 P, 99/304, 306, 307, 316, 317, 321
See application file for complete search history.

(56) References Cited

U.S. PATENT DOCUMENTS

| 4,555,984 | A  | * | 12/1985 | Yamashita ...................... 99/286 |
| 5,325,765 | A  | * | 7/1994  | Sylvan et al. ................... 99/295 |
| 5,840,189 | A  | * | 11/1998 | Sylvan et al. .................. 210/474 |
| 6,065,609 | A  | * | 5/2000  | Lake ............................. 210/474 |
| 7,328,651 | B2 | * | 2/2008  | Halliday et al. ................. 99/295 |
| 7,444,926 | B2 | * | 11/2008 | Nottingham et al. ........... 99/295 |
| 2005/0051478 | A1 | * | 3/2005  | Karanikos et al. ............ 210/469 |

* cited by examiner

*Primary Examiner* — Henry Yuen
*Assistant Examiner* — Hemant Mathew
(74) *Attorney, Agent, or Firm* — Timothy J. Klima; Shuttleworth & Ingersoll, PLC

(57) ABSTRACT

A single-use filtering capsule is provided for producing an alimentary infusion. The capsule includes a casing inside which is positioned a filtering sachet containing an aromatic essence. The sachet is perimetrally fixed to the casing in such a way as to separate two base extremities of the casing. A first perforable closure element allows the access of water to the aromatic essence. The first closure element is attached in closure of a first base extremity of the casing to which the sachet directs the inner side, a second closure element of a second base extremity of the casing to which the sachet directs the outer side. The capsule also includes dissociable member between the second closure element and the second base extremity of the casing, and gripping member for the second closure element for its dissociation from the second base extremity of the casing before the positioning of the capsule in an infusion apparatus.

11 Claims, 2 Drawing Sheets

SINGLE-USE FILTERING CAPSULE FOR THE CREATION OF AN ALIMENTARY INFUSION

FIELD OF INVENTION

The present invention refers to a single-use filtering capsule for the creation of an alimentary infusion, with preferred but not exclusive application in the field of American-type coffee drinks.

BACKGROUND

A type of single-use filtering capsule is known today comprising a filtering sachet in paper contained in a closed protective casing perforable at the opposed bases, after the capsule is positioned in the infusion apparatus, for the entry of water and the delivery of the infusion.

This filtering capsule must ensure the protection of the aromatic essence contained in the sachet to prevent both its oxidization in the air and its contamination by external agents.

A high filtering efficiency is demanded of this filtering capsule, a simple and inexpensive structure, and sufficient compactness to be able to be used also in automatic coffee machines.

One of the principal disadvantages of this filtering capsule is due to the fact of having to be subject to well-defined shapes and dimensions in order to preserve the integrity of the filtering sachet during the perforation of the base of the casing from which the infusion is delivered.

In particular it is necessary for the filtering capsule, when positioned in the infusing apparatus for use, to present a closed chamber between the sachet and the base through which the delivery of the infusion occurs, in such a way that the perforator of the infusion apparatus can penetrate this chamber to create the delivery path of the infusion without damaging the sachet.

It is evident that this type of filtering capsule must have, as mentioned above, a minimal bulk not below a certain safety threshold for protecting the filtering sachet, which however, can complicate the use of the filtering capsule in certain types of compact automatic coffee machines.

SUMMARY

The technical task which the present invention sets itself is, therefore, to make a single-use filtering capsule for the creation of an alimentary infusion which will make it possible to eliminate the technical disadvantages complained of in the known art.

Within the scope of this technical task an object of the invention is to manufacture a single-use filtering capsule, for producing an alimentary infusion, which has high filtering efficiency, a simple and inexpensive structure, and increased capacity for preserving the aromatic essence from oxidization in the air and from contamination.

Another object of the invention is to make a single-use filtering capsule, for producing an alimentary infusion, which is sufficiently compact to be able to be versatilely used in a multiplicity of types of automatic coffee machine that are present on the market.

The technical task, and these and other objects, are achieved according to the present invention by making a single-use filtering capsule, for producing an alimentary infusion, comprising a casing inside which is positioned a filtering sachet containing an aromatic essence, said sachet being perimetrally fixed to said casing in such a way as to separate the two base extremities of said casing, a first perforable closure element to allow the access of water to said aromatic essence, said first closure element being applied in closure of a first base extremity of said casing to which said sachet directs the inner side, a second closure element of a second base extremity of said casing to which said sachet directs the outer side, dissociable jointing between said second closure element and said second base extremity of said casing, and gripping member for said second closure element for its dissociation from said second base extremity of said casing before the positioning of said capsule in an infusion apparatus.

Preferably the second closure element is connected perimetrally along the edge of the second base extremity of the casing.

Preferably, the second closure element comprises a film.

Preferably the jointing comprise a bead of adhesive or weld along the edge of the second base extremity of the casing.

Preferably the gripping member comprise a portion of the film which is extended outside the bead of adhesive or weld.

Preferably the fixture between the sachet and the casing is made by welding between a perimetral band of the lateral wall of the sachet and a perimetral band of the lateral wall of the casing.

Preferably this welding is provided at a distance from the second closure element inversely proportional to the desired degree of extraction of the aromatic essence.

Preferably the lateral wall of the casing is conformed in steps for the execution of this welding precisely at the desired distance from the second closure element.

Preferably the sachet is made of paper and has a top open for the introduction of the aromatic essence.

Preferably the base of the sachet rests on the second closure element.

Preferably the sachet is positioned in a collapsed condition inside the casing in such a way as to stretch outside the second base extremity of the casing when the second closure element is removed.

Preferably the casing has at its first base extremity an external perimetral flange to retain it in the infusion apparatus.

BRIEF DESCRIPTION OF THE DRAWINGS

Further characteristics and advantages of the invention will become more evident from the description of a preferred, but not exclusive, embodiment of the single-use filtering capsule for the creation of an alimentary infusion according to the invention, illustrated by way of indication but without limiting effect in the attached drawings, in which.

DETAILED DESCRIPTION OF THE PREFERRED EMBODIMENTS

Figure 1:
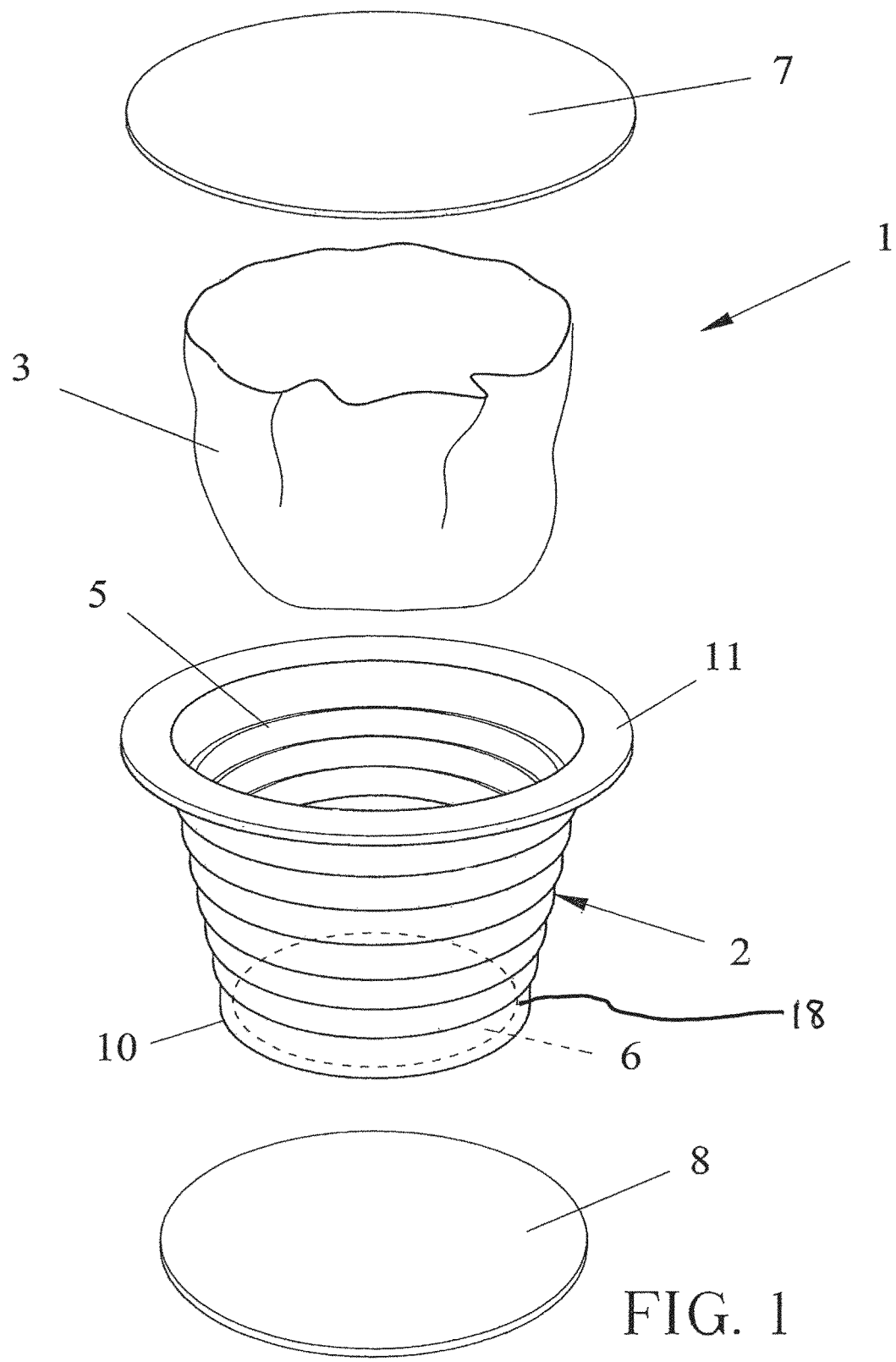
FIG. 1 shows an exploded perspective view of the single-use filtering capsule for American-type coffee corresponding to a preferred way of realizing the invention.
Figure 2:
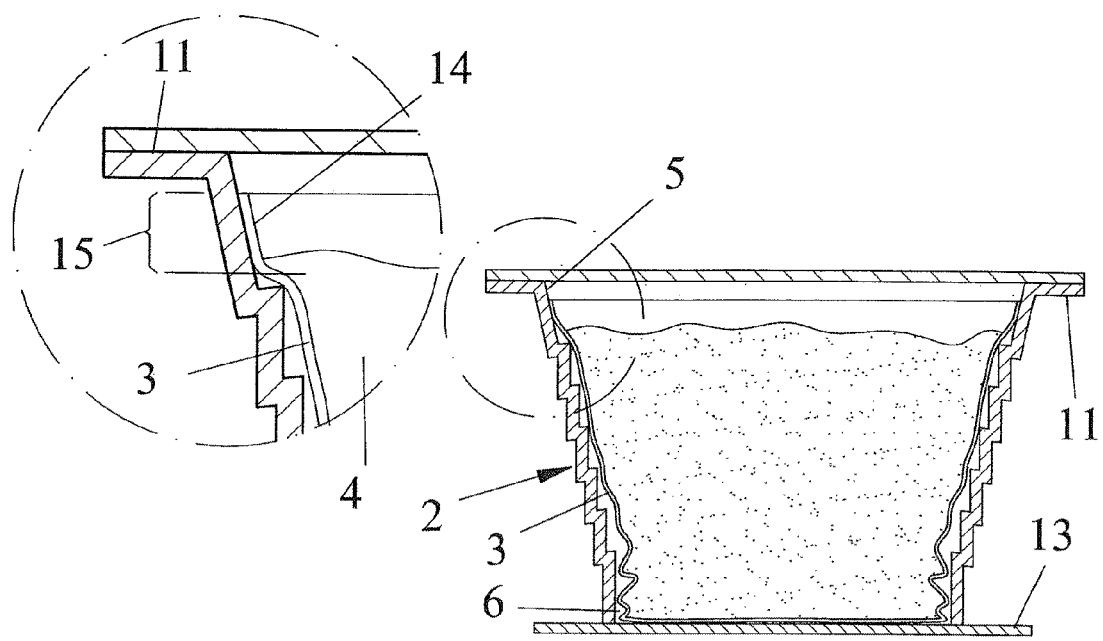
FIG. 2 shows a view in lateral elevation of the capsule shown in FIG. 1, axially sectioned.
Figure 3:
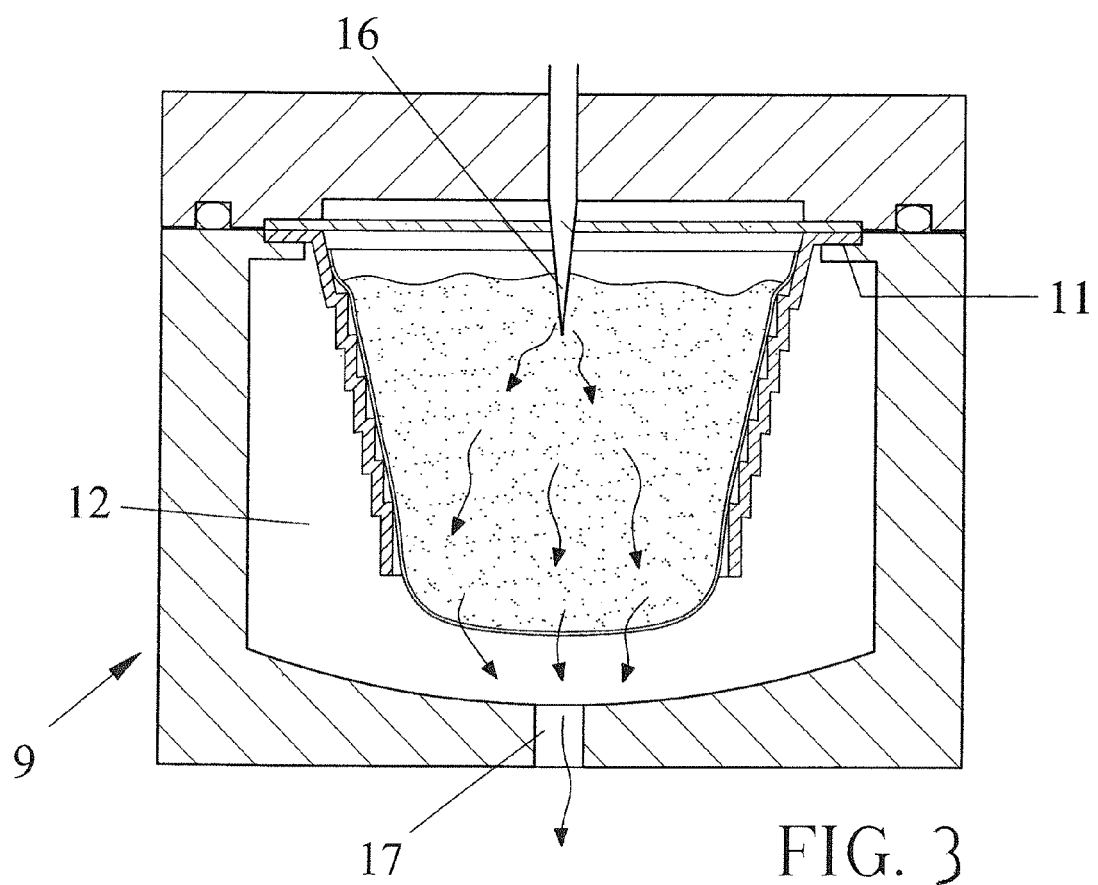
FIG. 3 shows a view in lateral elevation of the capsule shown in FIG. 1, axially sectioned in the infusion apparatus with arrows indicating the path of the water on entry and of the infusion delivered.

With reference to the figures mentioned, a single-use filtering capsule is shown, particularly for the production of American-type coffee, comprehensively indicated by the reference number 1.

The capsule 1 comprises a casing 2 inside which is positioned a filtering sachet 3 containing coffee in powder form 4.

The filtering sachet 3 is made of paper and has a top open for the introduction into its inside of the coffee in powder form 4.

The filtering sachet 3 is furthermore perimetrally fixed to the casing 2 in such a way as to separate from it the two base extremities 5, 6.

In particular the fixture is made by welding between a perimetral band 14 of the lateral wall of the filtering sachet 3 and a perimetral band 15 of the lateral wall of the casing 2.

A first closure element 7, perforable to allow the access of water to the coffee in powder form 4, is attached in closure of the first base extremity 5 of the casing 2 to which the sachet 3 directs the inner side.

The casing 2 has at its first base extremity 5 an external perimetral flange 11 to retain it in the infusion chamber 12 of an infusion apparatus 9.

The first closure element 7 is perimetrally fixed along the flange 11 by means of a bead of adhesive or weld.

A second closure element 8 is attached in closure of the second base extremity 6 of the casing 2 to which the sachet 3 directs the outer side.

Dissociable jointing 18 is also provided between the second closure element 8 and the second base extremity 6 of the casing 2, and gripping member 13 for the second closure element 8 for its dissociation from the second base extremity 6 of the casing 2 before the positioning of the capsule 1 in the infusion chamber 12 of the infusion apparatus 9.

The casing 2 has a tapered shape, as also has the sachet 3 which has, however, a more inclined lateral wall.

The shape of the casing 2, like that of the sachet 3, is not essential for the invention, the casing 2 having the sole function of protecting the sachet 3, and in particular its contents from exposure to the air and to possible contaminants, and supporting the sachet 3 and the closure elements 7 and 8.

In particular the airspace between the sachet and the casing 2 has the sole function of permitting the free exit of the infusion from the lateral wall of the sachet 3.

This airspace can therefore be small, as desired, given that, as a result of the modest pressure necessary for the preparation of American-type coffee, the infusion which crosses the lateral wall of the sachet 3 then runs downwards remaining substantially adhering to the outer surface of the lateral wall of the sachet 3, from which it separates by gravitational fall when it reaches the bottom.

The second closure element 8 is fixed perimetrally along the edge 10 of the second base extremity 6 of the casing 2.

In particular the second closure element 8, exactly like the first closure element 7, consists of a film made of a barrier material.

The jointing 18 comprises a bead of adhesive or weld along the edge 10 of the second base extremity 6 of the casing 2.

The gripping member 13 comprises a portion of the film constituting the second closure element 8, which is extended outside the bead of adhesive or weld between the second closure element 8 and the edge 10 of the second base extremity 6 of the casing 2.

Advantageously, the fixture of the filtering sachet 3 to the casing 2 is performed at a distance from the second closure element 8 inversely proportional to the desired degree of extraction of the coffee.

In substance, the more the position of the weld between sachet 3 and casing 2 is moved towards the second closure element 8, the less surface of the filtering sachet 3, specifically that comprised between the weld and the bottom of the sachet 3, will be active in the filtration, and the more the filtering time and therefore the degree of extraction of the aromatic essence will be increased, for a given pressure in the infusion chamber 12 and quantity of infused product.

To facilitate a weld of the sachet 3 to the casing 2 precisely at the desired distance from the second closure element 8, the lateral wall of the casing 2 is conformed in steps.

The attachment of the sachet 3 to the casing 2 is performed by means of a head of weld which runs from the open top of the sachet 3 until it presses against the band 15 of the casing 2, the band 14 of the sachet 3 which in its turn is supported precisely by the step of the lateral wall of the casing 2 which is situated at the desired height for making the weld.

In the solution illustrated the sachet 3 rests on the second closure element 8 before this is removed.

It is equally conceivable to provide for the sachet 3 to rest in a collapsed condition on the second closure element 8 in such a way as to stretch outside the second base extremity 6 of the casing 2 when, before the positioning of the capsule 1 in the infusion chamber 12, the second closure element 8 is removed. In this way the capsule 1, although being extremely compact before it is used, can permit in use an extended configuration of the sachet 3 which, by increasing the filtering surface, makes the infusion process more rapid and consequently increases the productivity of the infusion apparatus 9.

It should also be remarked that the provision of the second closure element 8 and of the casing 2, structurally independent of each other, easily allows the creation of a vacuum inside capsule 1 and/or the introduction into capsule 1 of an inert gas, typically nitrogen, to prevent the oxidization of the powdered coffee 4. In fact the vacuum and the protective atmosphere can be created through a suitable reclosable aperture between the second closure element 8 and the casing 2, therefore on the outside of the sachet 3 so as to avoid the escape of powdered coffee from the capsule 1.

The automatic coffee machine into which the filtering capsule 1 is loaded operates in the following way.

The second closure element 8 is removed from the second extremity 6 of the casing 2.

The capsule 1 is inserted into the infusion chamber 12 which in closing perforates with the perforator 16 the first closure element 7.

The perforator 16 has an internal channel which ducts the water into the sachet 3.

The water interacts with the powdered coffee 4 and generates the infusion, which after crossing the lateral and bottom wall of the sachet 3 abandons the capsule 1, there being nothing to retain it therein, given that the second closure element 8 is absent, and it collects in the bottom of the infusion chamber 12 where there is a delivery path 17 which ducts the infusion to the outside of the infusion chamber 12.

The single-use filtering capsule for producing an alimentary infusion thus conceived can also include numerous modifications and variants, all falling within the scope of the inventive concept; all the details are furthermore replaceable by technically equivalent elements.

In practice, the materials employed and also the dimensions shall be able to be any according to the requirements and the state of the art.

What is claimed is:

1. A single-use filtering capsule, for producing an alimentary infusion, comprising:
    a casing having a first base extremity on one side and a second base extremity on another side;
    a filtering sachet containing an aromatic essence positioned inside the casing, said sachet being perimetrally fixed to said casing in such a way as to separate the first and second base extremities of said casing, a first perforable closure element to allow access of water to said aromatic essence, said first closure element being attached to the casing to enclose the first base extremity of said casing, a second closure element for enclosing the second base extremity of said casing, a dissociable jointing member between said second closure element and said second base extremity of said casing for allowing the second closure element to be removed from the casing, the second closure element creating a sealed first condition of the capsule when covering the second base extremity where the second base extremity of the casing is sealed, and an open second condition when removed from the casing wherein an interior of the casing at the second base extremity is substantially entirely open to an exterior of the casing, and a gripping member attached to the second closure element for removing the second closure element from said second base extremity of said casing to place the capsule in the open second condition before positioning said capsule in an infusion apparatus, wherein the sachet is positioned in a collapsed condition inside said casing when the capsule is in the sealed first condition such that a base portion of said sachet rests on said second closure element, and when the capsule is in the open second condition, the sachet expands from the collapsed condition to extend externally of the casing to increase a usable filtering surface of the sachet in the open second condition.

2. The filtering capsule for producing an alimentary infusion according to claim 1, wherein said second closure element is connected perimetrally along an edge of said second base extremity of said casing.

3. The filtering capsule for producing an alimentary infusion according to claim 2, wherein said second closure element comprises a film.

4. The filtering capsule for producing an alimentary infusion according to claim 3, wherein said jointing comprises a bead of adhesive or weld along an edge of said second base extremity of said casing.

5. The filtering capsule for producing an alimentary infusion according to claim 4, wherein said gripping member comprise a portion of said film which extends outside said bead of adhesive or weld.

6. The filtering capsule for producing an alimentary infusion according to claim 1, wherein said filtering sachet is fixed to said casing by welding between a perimetral band of a lateral wall of said sachet and a perimetral band of the lateral wall of said casing.

7. The filtering capsule for producing an alimentary infusion according to claim 6, wherein said welding is provided at a distance from said second closure element inversely proportional to a desired degree of extraction of the aromatic essence.

8. The filtering capsule for producing an alimentary infusion according to claim 1, wherein a lateral wall of said casing is conformed in steps for the execution of a weld at a precise distance from said second closure element.

9. The filtering capsule for producing an alimentary infusion according to claim 1, wherein said sachet is made of paper and has an open top for the introduction of the aromatic essence.

10. The filtering capsule for producing an alimentary infusion according to claim 1, said casing comprising, adjacent to said first base extremity, an external perimetral flange to retain the casing in said infusion apparatus.

11. An automatic coffee machine adapted for use with a filtering capsule, the filtering capsule comprising:

a casing having a first base extremity on one side and a second base extremity on another side;

a filtering sachet containing an aromatic essence positioned inside the casing, said sachet being perimetrally fixed to said casing in such a way as to separate the first and second base extremities of said casing, a first perforable closure element to allow access of water to said aromatic essence, said first closure element being attached to the casing to enclose the first base extremity of said casing, a second closure element for enclosing the second base extremity of said casing, a dissociable jointing member between said second closure element and said second base extremity of said casing for allowing the second closure element to be removed from the casing, the second closure element creating a sealed first condition of the capsule when covering the second base extremity where the second base extremity of the casing is sealed, and an open second condition when removed from the casing wherein an interior of the casing at the second base extremity is substantially entirely open to an exterior of the casing, and a gripping member attached to the second closure element for removing the second closure element from said second base extremity of said casing to place the capsule in the open second condition before positioning said capsule in an infusion apparatus, wherein the sachet is positioned in a collapsed condition inside said casing when the capsule is in the sealed first condition such that a base portion of said sachet rests on said second closure element, and when the capsule is in the open second condition, the sachet expands from the collapsed condition to extend externally of the casing to increase a usable filtering surface of the sachet in the open second condition.

* * * * *